(12) United States Patent
Gupta et al.

(10) Patent No.: US 10,768,980 B2
(45) Date of Patent: Sep. 8, 2020

(54) AUTOMATED EXECUTION OF A BATCH JOB WORKFLOWS

(71) Applicant: American Express Travel Related Services Company, Inc., New York, NY (US)

(72) Inventors: Ashish Gupta, Phoenix, AZ (US); Prasanta Kumar Mishra, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 184 days.

(21) Appl. No.: 15/991,945

(22) Filed: May 29, 2018

(65) Prior Publication Data

US 2019/0370058 A1   Dec. 5, 2019

(51) Int. Cl.
| | | |
|---|---|---|
| *G06F 9/46* | (2006.01) | |
| *G06F 9/48* | (2006.01) | |
| *G06F 9/50* | (2006.01) | |

(52) U.S. Cl.
CPC ............ *G06F 9/4881* (2013.01); *G06F 9/466* (2013.01); *G06F 9/5038* (2013.01)

(58) Field of Classification Search
CPC ....... G06F 9/4881; G06F 9/5038; G06F 9/466
See application file for complete search history.

(56) References Cited

U.S. PATENT DOCUMENTS

| | | | |
|---|---|---|---|
| 6,405,364 B1* | 6/2002 | Bowman-Amuah | ........................ G06Q 10/06 717/101 |
| 9,619,291 B2* | 4/2017 | Pueyo | ................... G06F 9/5066 |
| 2005/0050480 A1* | 3/2005 | Katla | ................... G06F 17/5022 716/131 |
| 2006/0224432 A1* | 10/2006 | Li | .......................... G06Q 10/06 705/7.21 |
| 2008/0016554 A1* | 1/2008 | Rits | ........................ G06Q 10/06 726/4 |
| 2008/0282318 A1* | 11/2008 | Rits | ........................ G06Q 10/06 726/1 |
| 2009/0241117 A1* | 9/2009 | Dasgupta | .............. G06F 9/5038 718/101 |
| 2010/0161549 A1* | 6/2010 | Plancarte | .............. G06F 9/4843 707/608 |
| 2011/0125894 A1* | 5/2011 | Anderson | ............. H04L 9/3213 709/224 |
| 2011/0154341 A1* | 6/2011 | Pueyo | ................... G06F 9/5066 718/101 |
| 2015/0046425 A1* | 2/2015 | Lin | ....................... G06F 9/4843 707/708 |

* cited by examiner

*Primary Examiner* — Adam Lee

(74) *Attorney, Agent, or Firm* — Thomas Horstemeyer, LLP

(57) ABSTRACT

Systems and methods for the automated execution of batch job workflows are provided. The system may generate a batch job workflow having one or more jobs with each job having one or more tasks. The system may retrieve scheduler data corresponding to each task and indicating job dependencies, task dependencies, and technology wrappers needed to execute each task. The system may generate a task schedule based on the scheduler data. The system may execute each task in accordance with the scheduler data by transmitting each task to a wrapper environment to invoke a technology wrapper. The technology wrapper may enable each task to be executed across systems of varying technologies.

14 Claims, 3 Drawing Sheets

AUTOMATED EXECUTION OF A BATCH JOB WORKFLOWS

FIELD

The disclosure generally relates to executing batch jobs, and more specifically, to systems and methods for automating the execution of batch jobs across systems of varying technologies.

BACKGROUND

Business processes may rely on computer jobs to aide in data processing, statistics, analytics, and/or the like. The jobs may be configured to run on a variety of data sources across multiple platforms and systems. Each data source, platform, and/or system may utilize and be based on different technologies. As such, jobs being executed on different technologies may require different formats, parameters, and instructions based on the implemented technology. Typically, the execution of jobs may need manual intervention as a user engages multiple data sources across systems of varying technology. For example, the user may manually contact a technology team to request that a given job is executed in a particular system. Further, manual intervention is typically needed to identify related jobs that need to be executed for a given business process.

SUMMARY

Systems, methods, and articles of manufacture (collectively, the "system") for the automated execution of batch job workflows is disclosed. The system may generate a batch job workflow comprising at least one job, with each job having at least one task. The system may retrieve from an execution database scheduler data corresponding to at least one of the job or the task, wherein the scheduler data comprises a job dependency, a task dependency, and a technology wrapper assignment. The system may generate a task schedule based on the job dependency and the task dependency. The system may invoke a technology wrapper by transmitting the task to the technology wrapper, wherein the technology wrapper is invoked based on the technology wrapper assignment. The system may execute the task on a system using the technology wrapper.

In various embodiments, the system may receive a task execution result in response to the task being executed. The job may comprise a second task and the task dependency may comprise data indicating that the second task is dependent on the task. The system may invoke a second technology wrapper by transmitting the second task to the second technology wrapper, wherein the second technology wrapper is invoked based on the technology wrapper assignment. The system may execute the second task on a second system using the second technology wrapper.

In various embodiments, the system may receive a job selection comprising the job. The system may retrieve from the execution database configuration data corresponding to the job, wherein the configuration data comprises a user parameter. The system may receive a user parameter input in response to prompting a user terminal to input the user parameter. The system may generate the batch job workflow based on the job selection and the user parameter input. The job selection may be based on a user job authorization comprising data indicating at least one of jobs or batch job workflows that a user is authorized to execute. The job selection may also comprise a job selection order, and wherein the task schedule is based on the job selection order.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
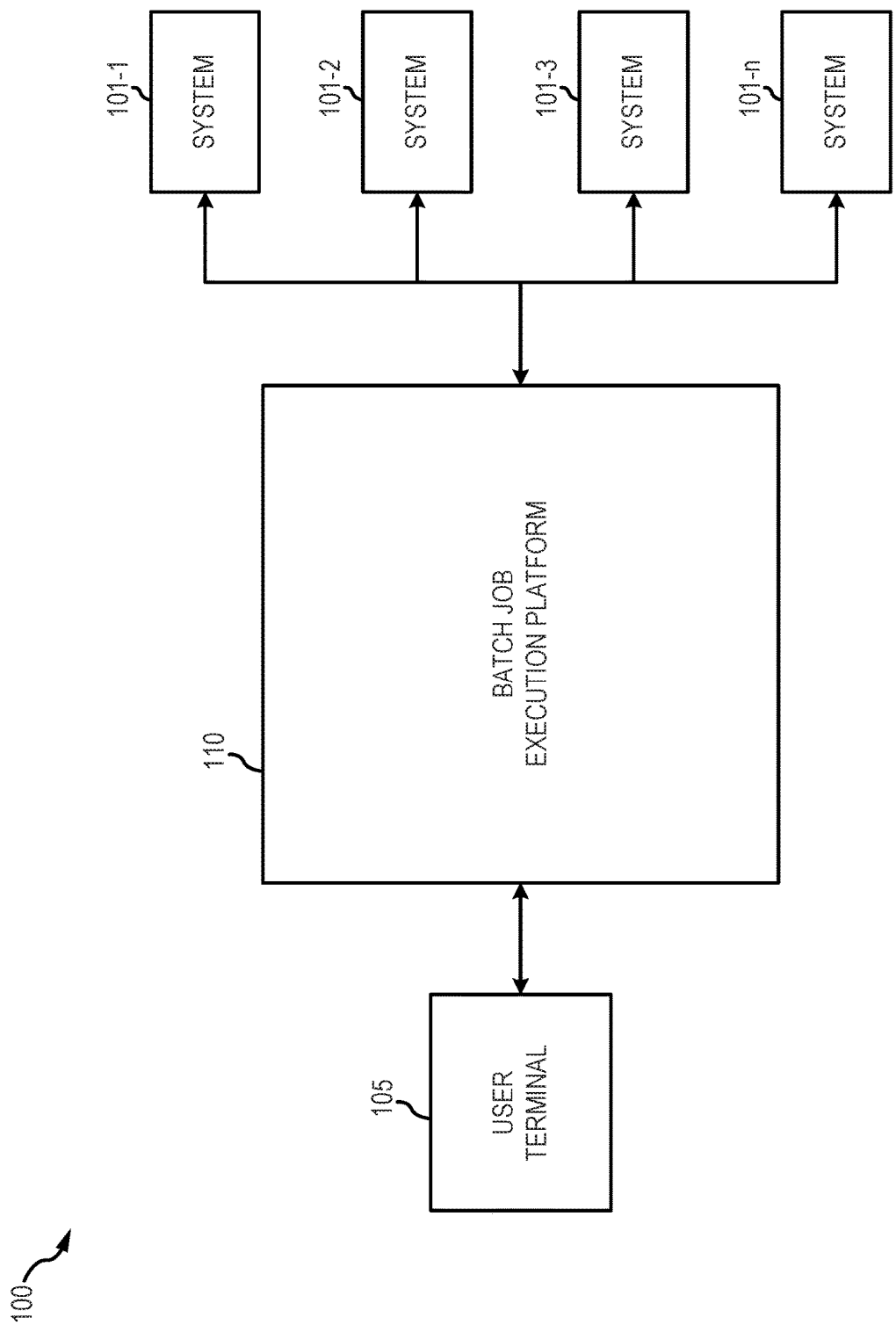
FIG. 1 is a block diagram illustrating a system for the automated execution of batch job workflows, in accordance with various embodiments.

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, systems, methods, and articles of manufacture (collectively, the "system") for the automated execution of batch job workflows are provided. The system may enable on-demand triggering and execution of batch job workflows across data systems that may implement and utilize different technologies. As discussed further herein, a batch job workflow may comprise one or more interrelated jobs for a given business process or technical process. For example, a batch job workflow may comprise one or more jobs configured to run credit requests, process transaction account applications, process transaction account payments, or the like. Each job may comprise a job ID. Each job in the batch job workflow may comprise at least one task. Each task may comprise a task ID. Each task may comprise a logical division of the job. For example, in response to the job comprising a data processing request on a given system, a first task may be retrieving the requested data, a second task may be preprocessing the retrieved data, a third task may be processing the data (e.g., executing a data processing algorithm, model, etc.), a fourth task may be post-processing the processed data, and/or a fifth task may be generating a data output based on the post-processed data. The system may generate a batch job workflow based on a user selection of one or more jobs. The system may generate a task schedule for the batch job workflow based on scheduler data, and may invoke various technology wrappers to execute each task in the corresponding system. The technology wrappers may enable tasks to be executed across systems of varying technology.

The system improves the functioning of the computer and/or networked system.

For example, by automating the execution of batch job workflows, the system more efficiently executes jobs and/or tasks thus reducing CPU, memory, and resource usage, and reducing the time and cost needed to execute the batch job workflows. Further, by the user simply selecting a batch job workflow or individual jobs to execute as opposed to manually executing one or more jobs, the user performs less computer functions and provides less input, which saves on data storage and memory which speeds processing. By providing a common interface and easy to understand naming conventions, users can easily setup and execute the batch job workflows rather than waiting for specific resource personnel who are knowledgeable of the backend batch jobs and their technologies, thus reducing or eliminating any wait time and increasing overall system efficiencies.

As used herein, "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" may include sending at least a portion of the electronic data from one system component to another (e.g., over a network connection). Additionally, as used herein, "data" may include encompassing information such as commands, queries, files, data for storage, information, and the like in digital or any other form.

In various embodiments, and with reference to FIG. 1, a system 100 for the automated execution of batch job workflows is disclosed. System 100 may also contemplate uses in association with web services, utility computing, pervasive and individualized computing, security and identity solutions, autonomic computing, cloud computing, commodity computing, mobility and wireless solutions, open source, biometrics, grid computing, and/or mesh computing. System 100 may comprise one or more of a user terminal 105, a batch job execution platform 110, and systems (e.g., system 101-1, system 101-2, system 101-3, system 101-*n*, etc.). The various systems, environments, platforms, servers, databases, and the like in system 100 may be in direct logical communication with each other via a bus, network, and/or through any other suitable means, or may be individually connected as described further herein. For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system. For example, and in accordance with various embodiments, the individual components of system 100 may be interconnected via a network.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE® talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

In various embodiments, user terminal 105 may be in electronic communication with batch job execution platform 110. User terminal 105 may be configured to allow a user to interact with batch job execution platform 110. For example, a user, via user terminal 105, may interact with batch job execution platform 110 to select jobs or batch job workflows to be executed, generate one or more batch job workflows, view execution results of jobs and/or batch job workflows executed by batch job execution platform 110, and/or the like. User terminal 105 may comprise any suitable hardware, software, and/or database components capable of sending, receiving, and storing data. For example, user terminal 105 may comprise a personal computer, personal digital assistant, cellular phone, smartphone (e.g., IPHONE®, BLACKBERRY®, and/or the like), Internet of things (IoT) device, kiosk, and/or the like. User terminal 105 may comprise an operating system, such as, for example, a WINDOWS® mobile operating system, an ANDROID® operating system, APPLE® IOS®, a BLACKBERRY® operating system, and the like. User terminal 105 may comprise software components installed on user terminal 105 and configured to allow a user, via user terminal 105, access to batch job execution platform 110. For example, user terminal 105 may comprise a web browser (e.g., MICROSOFT INTERNET EXPLORER®, GOOGLE CHROME®, etc.), an application, a micro-app or mobile application, or the like, configured to allow a user to access and interact with batch job execution platform 110.

In various embodiments, system 100 may comprise one or more systems that batch job execution platform 110 is configured to execute one or more jobs and/or tasks on. For example, system 100 may comprise a first system 101-1, second system 101-2, third system 101-3, an "Nth" system 101-n, and/or any other suitable or desired number of systems or subsystems (collectively, "systems 101"). Each system 101 may comprise any suitable combination of software, hardware, and/or database components. For example, systems 101 may each comprise at least one computing device in the form of a computer or processor, or a set of computers/processors, although other types of computing units or systems may be used, such as, for example, a server, web server, pooled servers, or the like. Systems 101 may also include one or more data centers, cloud storages, or the like, and may include software, such as APIs, configured to retrieve and write data to the blockchain. In various embodiments, systems 101 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, one or more systems 101 may comprise one or more data sources such as, for example, a source of data relating to a business process, financial process, or the like. For example, systems 101 may comprise tables merging data from various structured, semi-structured, and/or unstructured sources; merged files; merged databases; customized alerts, dashboards, and/or reports; dynamic monitoring based on intertwined data from multiple environments; data transmissions and/or migrations; and/or the like. As a further example, systems 101 may comprise sources of data related to financial and/or transactional systems and processes, such as, for example, a merchant submission system, a settlement database, an accounts receivable database, and/or the like.

In various embodiments, systems 101 may be based on, and/or implement or utilize, one or more technologies. For example, a system 101 may be a mainframe-based system, a JAVA®-based system, a data warehouse, or the like. Each technology may require different formats and commands in order to execute jobs and tasks on the respective system 101. In that respect, one or more systems 101 may comprise different technologies, with one or more systems 101 requiring different formats and commands to execute jobs and tasks. For example, and in accordance with various embodiments, each system 101-1, 101-2, 101-3, 101-n may comprise different technologies.

In various embodiments, batch job execution platform 110 may be in electronic communication with user terminal 105 and/or systems 101-1, 101-2, 101-3, 101-n. Batch job execution platform 110 may be configured to receive instructions from user terminal 105, generate one or more batch job workflows based on the instructions, and execute the batch job workflows on systems 101-1, 101-2, 101-3, 101-n, as discussed further herein. Batch job execution platform 110 may comprise any suitable combination of hardware, software, and/or database components. For example, batch job execution platform 110 may comprise at least one computing device in the form of a computer or processor, or a set of computers/processors, although other types of computing units or systems may be used, such as, for example, a server, web server, pooled servers, or the like. Batch job execution platform 110 may also include one or more data centers, cloud storages, or the like, and may include software, such as APIs, configured to retrieve and write data to the blockchain. In various embodiments, batch job execution platform may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

Figure 2:
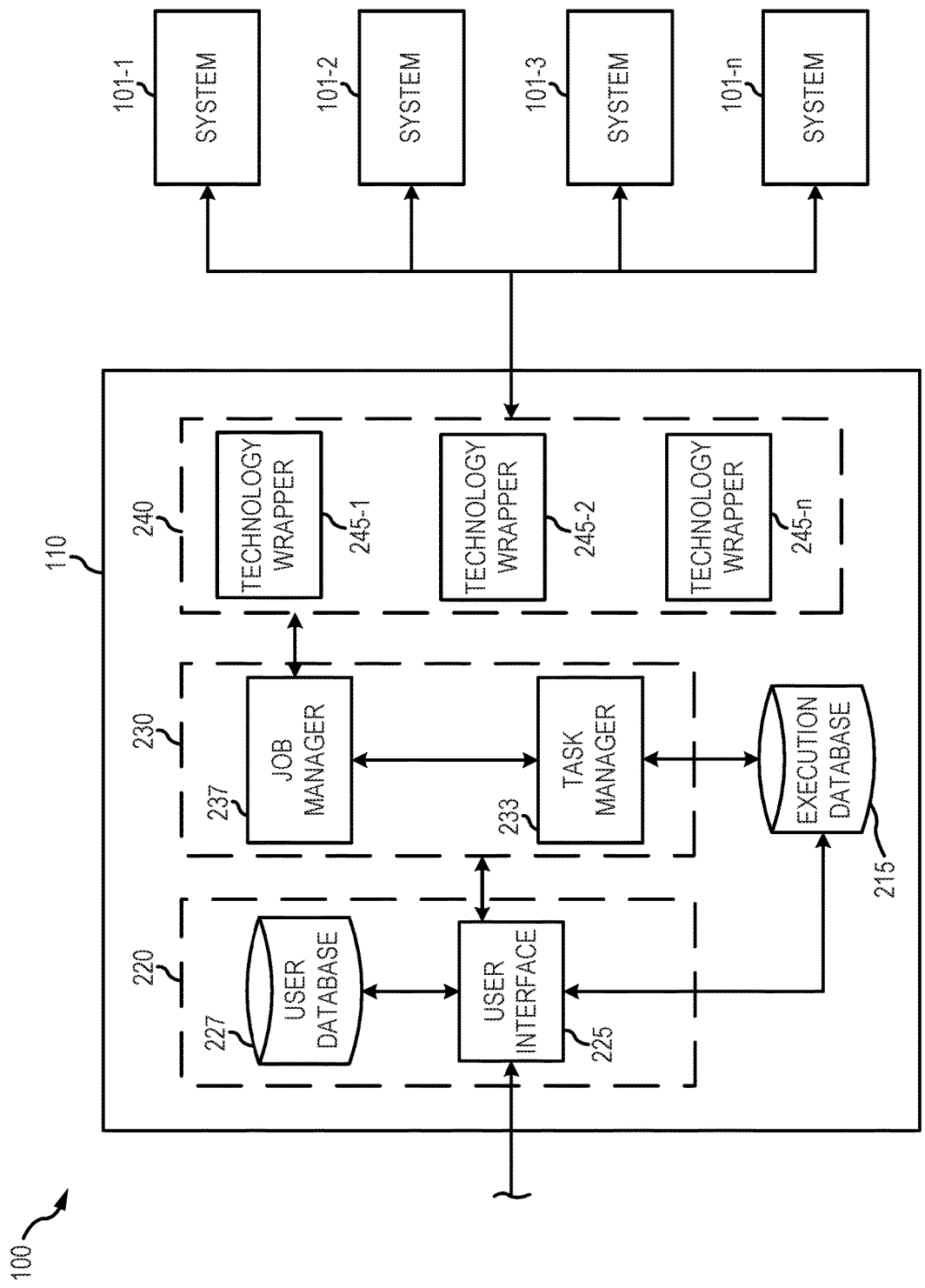
FIG. 2 is a block diagram illustrating various components of an exemplary batch job execution platform for use in a system for automated execution of batch job workflows, in accordance with various embodiments.

In various embodiments, and with reference to FIG. 2, an exemplary batch job execution platform 110 is depicted. Batch job execution platform 110 may comprise one or more of an execution database 215, a platform portal 220, an execution manager 230, and/or a wrapper environment 240. Execution database 215, platform portal 220, execution manager 230, and/or wrapper environment 240 may be in direct logical communication with each other via a bus, network, and/or through any other suitable means, or may be individually connected as described further herein.

In various embodiments, execution database 215 may be configured to store and maintain configuration data and scheduler data. Execution database 215 may be in logical and/or electronic communication with platform portal 220 (e.g., via user interface 225) and/or execution manager 230 (e.g., via task manager 233), and may comprise any suitable database or data structure capable of storing and maintaining data. The configuration data may comprise data regarding the configuration of each job and/or task. For example, the configuration data may comprise parameters needed for input prior to executing a job or task, such as a user parameter or a generated parameter. The parameters may comprise data fields of data entries needed to execute a given job or task. The user parameter may comprise data fields that need user's input before a job or task can be executed. The generated parameter may comprise data fields that can be retrieved from internal systems or randomly generated in test environments, and that does not need user's input before the job or task can be executed. The configuration data may be grouped and/or ordered by a job ID, a task ID, or similar identifier stored as data in each data entry, or as metadata in each data entry. The configuration data may be retrieved by platform portal 220 (e.g., via user interface 225) in response to a user selecting one or more jobs to be executing, and the configuration data may be used to prompt the user to input user parameters as needed.

The scheduler data may comprise data regarding the execution of each job and/or task. For example, the scheduler data may comprise job dependencies, task dependencies, a technology wrapper assignment, and/or a system assignment. The job dependencies may comprise data indicating the order and dependencies of jobs during execution. For example, the job dependencies may comprise data indicating associated jobs that are dependent on a given job for execution (e.g., based on a job ID). In that regard, the job dependencies may be used by execution manager 230 to ensure that jobs are executed in the correct order in a given batch job workflow, or across a plurality of batch job workflows. The task dependencies may comprise data indicating the order and dependencies of tasks during execution. For example, the task dependencies may comprise data indicating associated tasks that are dependent on a given task for execution (e.g., based on a task ID). In that regard, the task dependencies data may be used by execution manager 230 to ensure that tasks are executed in the correct order in a given job, or across a plurality of jobs in one or more batch job workflows. The technology wrapper assignment may comprise data indicating the technology wrapper from wrapper environment 240 (e.g., technology wrapper 245-1, 245-2, 245-n, etc.) that is needed to execute a particular job or task. The system assignment may comprise data indicating the system (e.g., system 101-1, 101-2, 101-3, 101-n, etc.) that a job or task is executed on. In various embodiments, the technology wrapper assignment may correspond to and be based on the system assignment. The scheduler data may be group and/or ordered by a job ID, a task ID, or similar identifier stored as data in each data entry, or as metadata in each data entry.

In various embodiments, platform portal 220 may be configured as a central access point to enable users to access batch job execution platform 110. Platform portal 220 may comprise various software, hardware, and/or database components. For example, platform portal 220 may comprise a user interface (UI) 225 and a user database 227. UI 225 may be in electronic and/or logical communication with user terminal 105, user database 227, and/or execution database 215. UI 225 may be configured to provide an interface accessible via user terminal 105 to enable a user to access batch job execution platform 110. UI 225 may comprise software, a web page, or the like, and may be accessible via a web browser (e.g., GOOGLE CHROME®, MICROSOFT INTERNET EXPLORER®, etc.), a mobile application (e.g., downloaded via APPLE® APP STORE®, GOOGLE PLAY®, etc.), or the like on user terminal 105. In that regard, the user, via user terminal 105, may access UI 225 to select jobs to be executed, input one or more user parameters based on the selected jobs, generate one or more batch job workflows, view execution results of jobs and/or batch job workflows executed by batch job execution platform 110.

User database 227 may comprise any suitable database or data structure capable of storing and maintaining user data. For example, user database 227 may be configured to store user data such as user access data (e.g., username, password, biometric data, etc.), user job authorizations, user job execution history, and the like. The user job authorizations may comprise data indicating jobs that a user is authorized or not authorized to execute. For example, the user job authorizations may comprise a list of job IDs, job descriptions, or the like. The ability to execute one or more jobs may be restricted based on the user's business group, technical capabilities, or the like. In that regard, upon a user accessing UI 225 (e.g., by entering user access data or the like), UI 225 may query user database 227 to retrieve the user job authorizations. UI 225 may display to the user only those jobs that the user is authorized to execute in accordance with the user job authorizations. For example, UI 225 may display the list of job IDs, job descriptions, or the like for selection by the user.

In various embodiments, execution manager 230 may be configured to receive batch job workflows from platform portal 220, parse each batch job workflow to determine the jobs and/or tasks contained therein, retrieve scheduler data corresponding to each job and/or task, invoke one or more technology wrappers in wrapper environment 240 (e.g., technology wrapper 245-1, 245-2, 245-n, etc.), and execute each task in one or more systems 101-1, 101-2, 101-3, 101-n, as discussed further herein. Execution manager 230 may comprise various software, hardware, and/or database components. For example, execution manager 230 may comprise a task manager 233 and a job manager 237.

In various embodiments, task manager 233 may be in logical and/or electronic communication with execution database 215 and/or job manager 237. Task manager 233 may be configured to receive batch job workflows, parse each batch job workflow to determine the jobs and/or tasks contained therein, retrieve scheduler data from execution database 215 corresponding to each job or task, and transmit the tasks to job manager 237 for execution. Task manager 233 may also be configured to track the execution progress of each task and transmit a dependent task to job manager 237 in response to the parent task being completed. In response to all of the tasks being executed, task manager 233 may be configured to transmit workflow execution results to UI 225. The workflow execution results may comprise data indicating whether the batch job workflow was completed, completed with errors, or failed to complete.

In various embodiments, job manager 237 may be in logical and/or electronic communication with task manager 233 and/or wrapper environment 240. Job manager 237 may be configured to receive one or more tasks from task manager 233, invoke a technology wrapper in wrapper environment 240 by transmitting one or more tasks to the technology wrapper (e.g., technology wrapper 245-1, 245-2, 245-n, etc.), and receive task execution results in response to each task being executed on one or more systems 101-1, 101-2, 101-3, 101-n. The task execution results may comprise data indicating whether the task was completed, completed with errors, or failed to complete. Job manager 237 may transmit the task execution result to task manager 233. In response to a dependent task existing corresponding to the completed task, job manager 237 may receive the dependent task from task manager 233, and may be configured to invoke the corresponding technology wrapper to execute the dependent task.

In various embodiments, wrapper environment 240 may be in logical and/or electronic communication with execution manager 230 (e.g., via job manager 237) and one or more systems (e.g., system 101-1, 101-2, 101-3, 101-n, etc.). Wrapper environment 240 may comprise a software library, data structure, or the like configured to store and maintain one or more technology wrappers. For example, wrapper environment 240 may comprise one or more technology wrappers, such as, for example, a first technology wrapper 245-1, a second technology wrapper 245-2, an "Nth" technology wrapper 245-n, and/or any other suitable or desired number of technology wrappers 245. For example, and in accordance with various embodiments, wrapper environment 240 may comprise a technology wrapper 245 corresponding to each different technology employed by the systems 101-1, 101-2, 101-3, 101-n.

Each technology wrapper 245-1, 245-2, 245-n may comprise a software program, class, data structure, or the like configured to encapsulate a task so that the task can be executed in a system 101-1, 101-2, 101-3, 101-n having a specified technology. For example, different technologies may format data differently and may need different commands to execute tasks. Thus each technology wrapper 245-1, 245-2, 245-n may comprise data and programming configured to convert each task into a format compatible for the corresponding system 101-1, 101-2, 101-3, 101-n. Additionally, different technologies and systems may need login information and/or IDs to access and execute tasks. As such, each technology wrapper 245-1, 245-2, 245-*n* may also comprise system specific, or general as needed, access credentials to ensure that tasks can be executed on the corresponding system 101-1, 101-2, 101-3, 101-*n*.

In various embodiments, a technology wrapper 245-1, 245-2, 245-*n* may be invoked by execution manager 230 (e.g., via job manager 237) in response receiving a task to execute. For example, execution manager 230 may transmit the task to the specific technology wrapper with instructions to execute the task on one or more systems 101-1, 101-2, 101-3, 101-*n*. In response to completing execution of the task, the technology wrapper 245-1, 245-2, 245-*n* may be configured to return a task execution result to execution manager 230.

Figure 3:
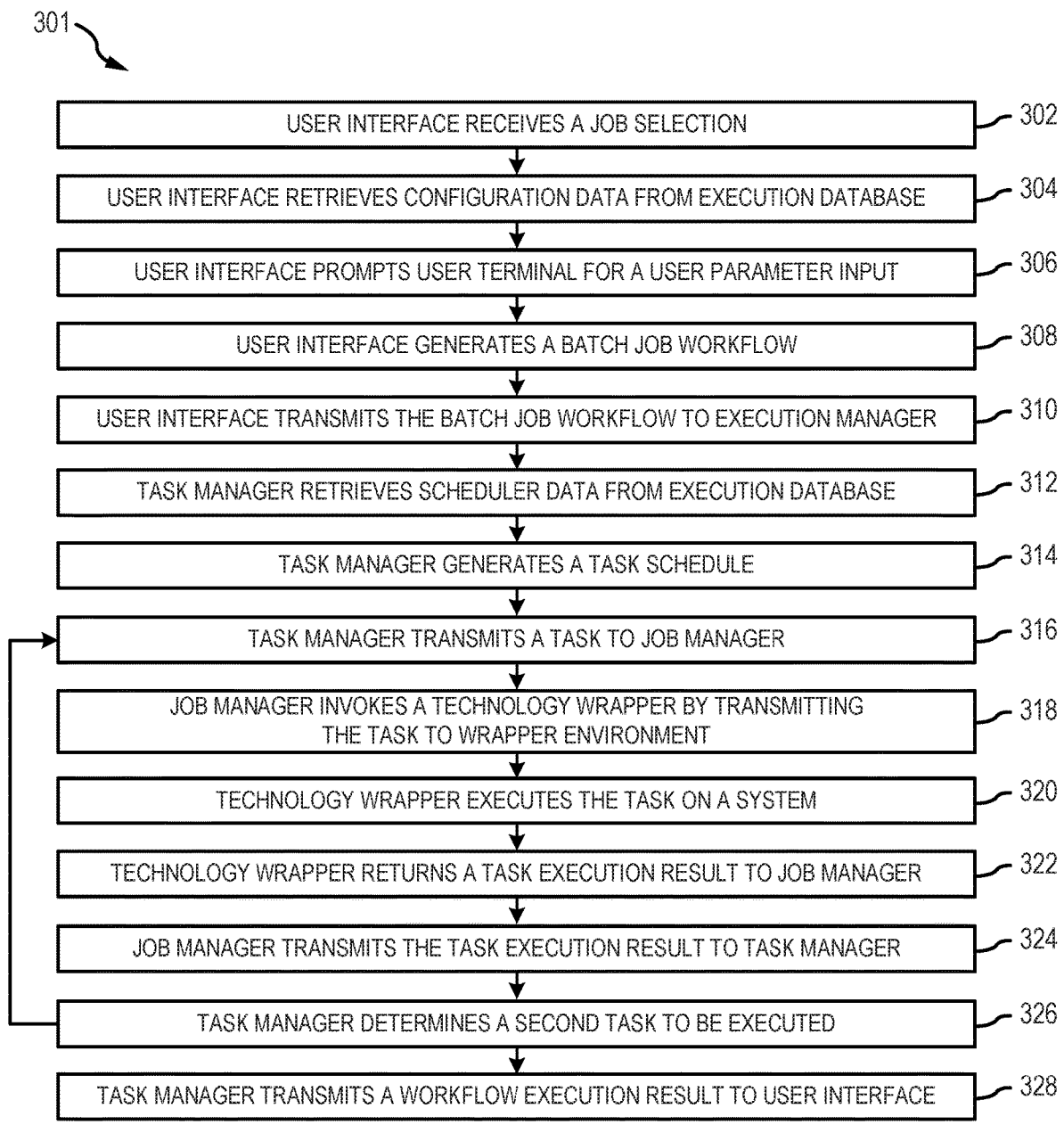
FIG. 3 illustrates a process flow for a method of automated execution of batch job workflows, in accordance with various embodiments.

Referring now to FIG. 3 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and elements depicted in FIG. 3, but also to the various system components as described above with reference to FIGS. 1 and 2.

In various embodiments, a method 301 for executing batch job workflows is disclosed. A user may access batch job execution platform 110 to access and view available jobs to be executed, to begin the process of generating and executing one or more batch job workflows, and/or to view workflow execution results, as discussed further herein. For example, a user, via user terminal 105, may access UI 225 and may submit user credentials (e.g., username, password, biometric input, etc.) to request access to batch job execution platform 110. UI 225 may query user database 227 based on the user credentials to authenticate the user (e.g. by comparing the user credentials to stored user credentials, and/or via any other suitable authentication process). In response to authenticating the user, UI 225 may query user database 227 to retrieve user job authorizations corresponding to the jobs the user is authorized to execute. For example, administrative personnel (e.g., a manager or the like) may initially provide job authorizations when creating a profile for the user. UI 225 may display to the user jobs that the user is authorized to execute, such as, for example, by displaying job IDs, job descriptions, or the like. In various embodiments, UI 225 may also display the authorized jobs grouped by batch job workflow such that the user may simply select a batch job workflow to initiate execution of the underlying jobs and tasks. In various embodiments, a back-end system may also communicate with batch job execution platform 110 to access available jobs to be executed, to begin the process of generating and executing one or more batch job workflows, and/or to retrieve workflow execution results. For example, a back-end system may be configured to communicate with batch job execution platform 110 in response to a predetermined event.

In various embodiments, UI 225 receives a job selection (step 302) from user terminal 105, based on the user's selection of one or more authorized jobs. The job selection may comprise one or more jobs that the user desires to be executed in batch job execution platform 110, and may comprise one or more job IDs. In various embodiments, in response to the user selecting two or more jobs to be executed, the user may also input a job order to specify the order that each job is to be executed (e.g., job 2, job 5, job 4, job 1, job 3, or the like). In response to receiving the job selection, UI 225 retrieves configuration data from execution database 215 (step 304). For example, UI 225 may query execution database 215 based on each job ID corresponding to the job selections to retrieve configuration data corresponding to each job selected to be executed. The configuration data may comprise data indicating the tasks comprised in each selected job (e.g., by task IDs), user parameters or generated parameters needed to execute each task. The user parameters may comprise data fields needing a user input before the task can be executed. In that regard, the user parameters may correspond to each task and comprise data fields needed for that particular task. The generated parameters may comprise data fields of data that can be retrieved from internal systems or randomly generated. In response to retrieving the configuration data and a user parameter being present, UI 225 prompts user terminal 105 for a user parameter input (step 306). For example, UI 225 may display to the user, via user terminal 105, each user parameter that needs to be input. The user may interact with UI 225 to input data, or select from prefilled data, for each user parameter.

In various embodiments, in response to the user inputting data for each user parameter or selecting to execute the selected jobs, UI 225 generates a batch job workflow (step 308). The batch job workflow may comprise each selected job, the specified job order, the user parameter inputs, and/or the generated parameters. UI 225 transmits the batch job workflow to execution manager 230 (step 310). For example, the user parameter inputs may comprise a data source, a destination file, or the like. In that respect each selected job may be populated with the corresponding user parameter inputs and/or generated parameters, and the selected jobs may be ordered at least partially based on the specified job order in the batch job workflow.

In response to receiving the batch job workflow, task manager 233 may parse and/or analyze the batch job workflow to determine the jobs contained therein and the tasks corresponding to each job. Task manager 233 retrieves scheduler data from execution database 215 (step 312) based on the batch job workflow. Task manager 233 may query execution database 215 based on the job ID of each job in the batch job workflow to retrieve scheduler data regarding each job. The scheduler data may comprise a job dependency, a task dependency, a technology wrapper assignment, and/or a system assignment. The job dependency may comprise data indicating whether a given job is dependent on the execution of a second job, and/or whether the given job is the parent job of any dependent jobs. The task dependency may comprise data indicating whether a given task in a job is dependent on the execution of a second task in the job, and/or whether the given task is the parent task of any dependent tasks in the job. The technology wrapper assignment may comprise data indicating the technology wrapper (e.g., technology wrapper 245-1, 245-2, 245-*n*, etc.) needed for each task to be executed. In that regard, and in accordance with various embodiments, each task may be assigned to different technology wrappers. In various embodiments, the tasks associated with a given job may all be assigned to the same technology wrapper. The system assignment may comprise data indicating the system (e.g., system 101-1, 101-2, 101-3, 101-*n*, etc.) that each task is assigned to be executed on.

In various embodiments, task manager 233 generates a task schedule (step 314) based on the scheduler data. The task schedule may comprise an ordering of tasks to be executed. For example, in response to the scheduler data indicating that one or more tasks are dependent on a parent task, the tasks may be ordered accordingly such that dependent tasks are executed after the parent task. In response to a task not being dependent on another task, the task may be scheduled to be executed in parallel with other tasks, such that two or more tasks may be executed at the same time on a given system or across multiple systems. In various embodiments, wherein a job ordering is specified by the user, the task schedule may also account for the specified ordering. Task manager 233 transmits a task to job manager 237 (step 316) based on the task schedule. For example, task manager 233 may transmit each task in the order specified in the task schedule for execution. Task manager 233 may transmit each task with the corresponding scheduler data, user parameters, and generated parameters such that job manager 237 can invoke the correct technology wrapper and execute the task on the correct system.

In response to receiving a task, job manager 237 invokes a technology wrapper 245-1, 245-2, 245-n by transmitting the task to wrapper environment 240 (step 318). For example, job manager may transmit the task to the technology wrapper specified in the scheduler data corresponding to the task. In response to receiving the task, the invoked technology wrapper 245-1, 245-2, 245-n may encapsulate the task to enable the task to be executed on a corresponding system 101-1, 101-2, 101-3, 101-n. In that respect, the invoked technology wrapper 245-1, 245-2, 245-n may allow users to select and execute one or more jobs at an interface level without any needed expertise in the underlying technology required to execute the job (e.g., mainframe, JAVA®, etc.). The invoked technology wrapper 245-1, 245-2, 245-n executes the task on a system 101-1, 101-2, 101-3, 101-n (step 320). The task may be executed based on the user parameters and/or generated parameters. The invoked technology wrapper 245-1, 245-2, 245-n returns a task execution result to job manager 237 (step 322) in response to executing the task on a system 101-1, 101-2, 101-3, 101-n. The task execution result may comprise data indicating whether the task was completed, completed with errors, or failed to complete. The task execution result may be generated by the task during execution of the task on a system 101-1, 101-2, 101-3, 101-n. Job manager 237 transmits the task execution result to task manager 233 (step 324).

In response to receiving the task execution result, task manager 233 determines a second task to be executed (step 326) based on the task schedule. For example, the second task may comprise a task that is dependent on the previously executed task. Task manager 233 may transmit the second task to job manager 237 (e.g., similar to in step 316) and job manager 237 may execute the task by invoking a technology wrapper, similar to in steps 318-324. In that regard, task manager 233 may iterate through all of the tasks in the task schedule until each task has been executed. In response to completing execution of all tasks, task manager 233 may generate a workflow execution result. The workflow execution result may comprise the task execution results of each task executed for the corresponding batch job workflow. The task execution results may also comprise data indicating whether the batch job workflow completed execution. Task manager 233 transmits the workflow execution result to UI 225 (step 328).

The disclosure and claims do not describe only a particular outcome of automating the execution of batch job workflows, but the disclosure and claims include specific rules for implementing the outcome of automating the execution of batch job workflows and that render information into a specific format that is then used and applied to create the desired results of automating the execution of batch job workflows, as set forth in *McRO, Inc. v. Bandai Namco Games America Inc.* (Fed. Cir. case number 15-1080, Sep. 13, 2016). In other words, the outcome of automating the execution of batch job workflows can be performed by many different types of rules and combinations of rules, and this disclosure includes various embodiments with specific rules. While the absence of complete preemption may not guarantee that a claim is eligible, the disclosure does not sufficiently preempt the field of automating the execution of batch job workflows at all. The disclosure acts to narrow, confine, and otherwise tie down the disclosure so as not to cover the general abstract idea of just automating the execution of batch job workflows. Significantly, other systems and methods exist for automating the execution of batch job workflows, so it would be inappropriate to assert that the claimed invention preempts the field or monopolizes the basic tools of automating the execution of batch job workflows. In other words, the disclosure will not prevent others from automating the execution of batch job workflows, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility,* 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include a graphical user interface (e.g., via UI 225 displayed on user terminal 105, with brief reference to FIG. 2) for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. Record of Charge (ROC) data includes important information and enhanced data. For example, a ROC may contain details such as location, merchant name or identifier, transaction amount, transaction date, account number, account security pin or code, account expiry date, and the like for the transaction. Such enhanced data increases the accuracy of matching the transaction data to the receipt data. Such enhanced ROC data is NOT equivalent to transaction entries from a banking statement or transaction account statement, which is very limited to basic data about a transaction. Furthermore, a ROC is provided by a different source, namely the ROC is provided by the merchant to the transaction processor. In that regard, the ROC is a unique identifier associated with a particular transaction. A ROC is often associated with a Summary of Charges (SOC). The ROCs and SOCs include information provided by the merchant to the transaction processor, and the ROCs and SOCs are used in the settlement process with the merchant. A transaction may, in various embodiments, be performed by a one or more members using a transaction account, such as a transaction account associated with a gift card, a debit card, a credit card, and the like.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., FACEBOOK®, YOUTUBE®, APPLE® TV®, PANDORA®, MICROSOFT® XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, FACEBOOK® message, TWITTER® tweet and/or message, MMS, and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, INSTAGRAM®, LINKEDIN®, SNAPCHAT®, TWITTER®, and the like. Examples of affiliate or partner websites include AMERICAN EXPRESS®, GROUPON®, LIVING- SOCIAL®, and the like. Moreover, examples of mobile device communications include texting, email, and mobile applications for smartphones.

In various embodiments, the methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory or in-memory (non-spinning) hard drives. The secondary memory may include, for example, a hard disk drive and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components may include any suitable processor, or the like, such as application specific integrated circuits (ASICs). Implementation of the hardware machine so as to perform the functions described herein will be apparent to persons skilled in the relevant art(s).

In various embodiments, the server may include application servers (e.g. WEBSPHERE®, WEBLOGIC®, MOSS®, EDB® POSTGRES PLUS ADVANCED SERVER® (PPAS), etc.). In various embodiments, the server may include web servers (e.g. APACHE®, IIS, GWS, SUN JAVA® SYSTEM WEB SERVER, JAVA® Virtual Machine running on LINUX® or WINDOWS®).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

As those skilled in the art will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16-bit integers.

Any databases discussed herein may include relational, hierarchical, graphical, blockchain, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a Hyperledger® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, and U.S. application Ser. No. 15/943,271 titled FRAUD MANAGEMENT USING A DISTRIBUTED DATABASE and filed on Apr. 2, 2018, the contents of which are each incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPE"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® web server software, a MICROSOFT® SQL Server database system, and a MICROSOFT® Commerce Server. Additionally, components such as MICROSOFT® ACCESS® or MICROSOFT® SQL Server, ORACLE®, SYBASE®, INFORMIX® MySQL, INTERBASE®, etc., may be used to provide an Active Data Object (ADO) compliant database management system. In one embodiment, the Apache web server is used in conjunction with a Linux operating system, a MYSQL® database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT®, active server pages (ASP), common gateway interface scripts (CGI), extensible markup language (XML), dynamic HTML, cascading style sheets (CSS), AJAX (Asynchronous JAVASCRIPT® And XML), helper applications, plug-ins, and the like. A server may include a web service that receives a request from a web server, the request including a URL and an IP address (e.g., 192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE® MQTM (formerly MQSeries) by IBM®, Inc. (Armonk, N.Y.) is an example of a commercially available middleware product. An Enterprise Service Bus ("ESB") application is another example of middleware.

Those skilled in the art will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks (e.g., method 301, with brief reference to FIG. 3).

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is intended to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   generating, by a batch job execution platform, a batch job workflow, wherein the batch job workflow comprises a batch job having a first task and a second task, the first task and the second task not being dependent on one another;
   retrieving, by the batch job execution platform and from an execution database, first scheduler data corresponding to the first task in the batch job and second scheduler data corresponding to the second task in the batch job, wherein each respective scheduler data comprises a batch job dependency, a task dependency, a system assignment, and a technology wrapper assignment, a respective system assignment indicating a corresponding system on which to execute the respective task, a respective technology wrapper assignment being based at least in part on the respective system assignment;
   determining, by the batch job execution platform and based on first and second wrapper and system assignments, that the first and second wrapper and system assignments are different;
   generating, by the batch job execution platform, a task schedule based on the first scheduler data and the second scheduler data;
   invoking, by the batch job execution platform, a first technology wrapper by transmitting the first task to the first technology wrapper, wherein the first technology wrapper is invoked based on a first technology wrapper assignment and comprises first access credentials for executing the first task on a first system, the first system being based on the first system assignment;
   invoking, by the batch job execution platform, a second technology wrapper by transmitting the second task to the second technology wrapper, wherein the second technology wrapper is invoked based on a second technology wrapper assignment and comprises second access credentials different than the first access credentials for executing the second task on a second system, the second system being based on the second system assignment; and
   executing, by the batch job execution platform, the first task on the first system using the first technology wrapper in parallel with the second task on the second system using the second technology wrapper.

2. The method of claim 1, further comprising receiving, by the batch job execution platform, first and second task execution results in response to the first and second tasks being executed.

3. The method of claim 1, further comprising:
   receiving, by the batch job execution platform, a job selection comprising the batch job;
   retrieving, by the batch job execution platform from the execution database, configuration data corresponding to the batch job, wherein the configuration data comprises a user parameter;
   receiving, by the batch job execution platform, a user parameter input in response to prompting a user terminal to input the user parameter; and generating, by the batch job execution platform, the batch job workflow based on the job selection and the user parameter input.

4. The method of claim 3, wherein the job selection is based on a user job authorization comprising data indicating at least one of jobs or batch job workflows that a user is authorized to execute.

5. The method of claim 3, wherein the job selection comprises a job selection order, and wherein the task schedule is based on the job selection order.

6. A computer-based system for executing batch job workflows, comprising:
  a processor and a tangible, non-transitory memory configured to communicate with the processor, the tangible, non-transitory memory having instructions stored thereon that, in response to execution by the processor, cause the processor to perform operations comprising:
    generating, by the processor, a batch job workflow, wherein the batch job workflow comprises a batch job having a first task and a second task, the first task and the second task not being dependent on one another;
    retrieving, by the processor and from an execution database, first scheduler data corresponding to the first task in the batch job and second scheduler data corresponding to the second task in the batch job, wherein each respective scheduler data comprises a batch job dependency, a task dependency, a system assignment, and a technology wrapper assignment, a respective system assignment indicating a corresponding system on which to execute the respective task, a respective technology wrapper assignment being based at least in part on the respective system assignment;
    determining, by the processor and based on first and second wrapper and system assignments, that the first and second wrapper and system assignments are different;
    generating, by the processor, a task schedule based on the first scheduler data and the second scheduler data;
    invoking, by the processor, a first technology wrapper by transmitting the first task to the first technology wrapper, wherein the first technology wrapper is invoked based on a first technology wrapper assignment and comprises first access credentials for executing the first task on a first system, the first system based on the first system assignment;
    invoking, by the processor, a second technology wrapper by transmitting the second task to the second technology wrapper, wherein the second technology wrapper is invoked based on a second technology wrapper assignment and comprises second access credentials different than the first access credentials for executing the second task on a second system, the second system based on the second system assignment; and
    executing, by the processor, the first task on the first system using the first technology wrapper in parallel with the second task on the second system using the second technology wrapper.

7. The computer-based system of claim 6, further comprising receiving, by the processor, first and second task execution results in response to the first and second tasks being executed.

8. The computer-based system of claim 6, further comprising:
  receiving, by the processor, a job selection comprising the batch job; retrieving, by the processor from the execution database, configuration data corresponding to the batch job, wherein the configuration data comprises a user parameter;
  receiving, by the processor, a user parameter input in response to prompting a user terminal to input the user parameter; and
  generating, by the processor, the batch job workflow based on the job selection and the user parameter input.

9. The computer-based system of claim 8, wherein the job selection is based on a user job authorization comprising data indicating at least one of jobs or batch job workflows that a user is authorized to execute.

10. The computer-based system of claim 8, wherein the job selection comprises a job selection order, and wherein the task schedule is based on the job selection order.

11. An article of manufacture including a non-transitory, tangible computer readable storage medium having instructions stored thereon that, in response to execution by a computer-based system, cause the computer-based system to perform operations comprising:
  generating, by the computer-based system, a batch job workflow, wherein the batch job workflow comprises a batch job having a first task and a second task, the first task and the second task not being dependent on one another;
  retrieving, by the computer-based system and from an execution database, first scheduler data corresponding to the first task in the batch job and second scheduler data corresponding to the second task in the batch job, wherein each respective scheduler data comprises a batch job dependency, a task dependency, a system assignment, and a technology wrapper assignment, a respective system assignment indicating a corresponding system on which to execute the respective task, a respective technology wrapper assignment being based at least in part on the respective system assignment;
  determining, by the computer-based system and based on first and second wrapper and system assignments, that the first and second wrapper and system assignments are different;
  generating, by the computer-based system, a task schedule based on the first scheduler data and the second scheduler data;
  invoking, by the computer-based system, a first technology wrapper by transmitting the first task to the first technology wrapper, wherein the first technology wrapper is invoked based on a first technology wrapper assignment and comprises first access credentials needed to execute the first task on a first system, the first system based on the first system assignment;
  invoking, by the computer-based system, a second technology wrapper by transmitting the second task to the second technology wrapper, wherein the second technology wrapper is invoked based on a second technology wrapper assignment and comprises second access credentials different than the first access credentials for executing the second task on a second system, the second system based on the second system assignment; and
  executing, by the computer-based system, the first task on the first system using the first technology wrapper in parallel with the second task on the second system using the second technology wrapper.

12. The article of manufacture of claim 11, further comprising receiving, by the computer-based system, first and second task execution results in response to the first and second tasks being executed.

13. The article of manufacture of claim 11, further comprising:
- receiving, by the computer-based system, a job selection comprising the batch job;
- retrieving, by the computer-based system from the execution database, configuration data corresponding to the batch job, wherein the configuration data comprises a user parameter;
- receiving, by the computer-based system, a user parameter input in response to prompting a user terminal to input the user parameter; and
- generating, by the computer-based system, the batch job workflow based on the job selection and the user parameter input.

14. The article of manufacture of claim 13, wherein the job selection is based on a user job authorization comprising data indicating at least one of jobs or batch job workflows that a user is authorized to execute, and wherein the job selection comprises a job selection order and the task schedule is based on the job selection order.

* * * * *